United States Patent

[11] 3,602,550

| [72] | Inventors | Fred S. Patane<br>R.D. 3, Sewell, N.J. 08080;<br>John L. Caselli, Brewster Road, Newfield, N.J. 08344 |
|---|---|---|
| [21] | Appl. No. | 820,571 |
| [22] | Filed | Apr. 30, 1969 |
| [45] | Patented | Aug. 31, 1971 |

[54] BICYCLE WHEEL COVER
4 Claims, 8 Drawing Figs.

[52] U.S. Cl. .................................................. 301/37 S,
161/31, 301/37 SA
[51] Int. Cl. ..................................................... B60b 7/04
[50] Field of Search........................................... 301/37, 64

[56] References Cited
UNITED STATES PATENTS

| 1,989,839 | 2/1935 | Zeller | 301/37 SA |
| 2,123,101 | 7/1938 | Farr | 301/37 X |
| 3,004,798 | 10/1961 | Tylle | 301/37 S |
| 3,317,246 | 5/1967 | Wester | 301/37 SA |

FOREIGN PATENTS

| 4,068 | 1907 | Great Britain | 301/37 S |

Primary Examiner—Richard J. Johnson
Attorney—Caesar, Rivise, Bernstein & Cohen

ABSTRACT: A cover for a spoked wheel which includes a pair of side cover plates. Each of the cover plates includes a planar annular band and a plurality of radially tapering projections which are integral with the band and extend inwardly thereof. The band has an outer diameter which is substantially equal to the inner diameter of the rim of the wheel. The plates are secured on opposite sides of the wheels and the projections thereof are adapted to conform to the pitch of the spokes of the wheel.

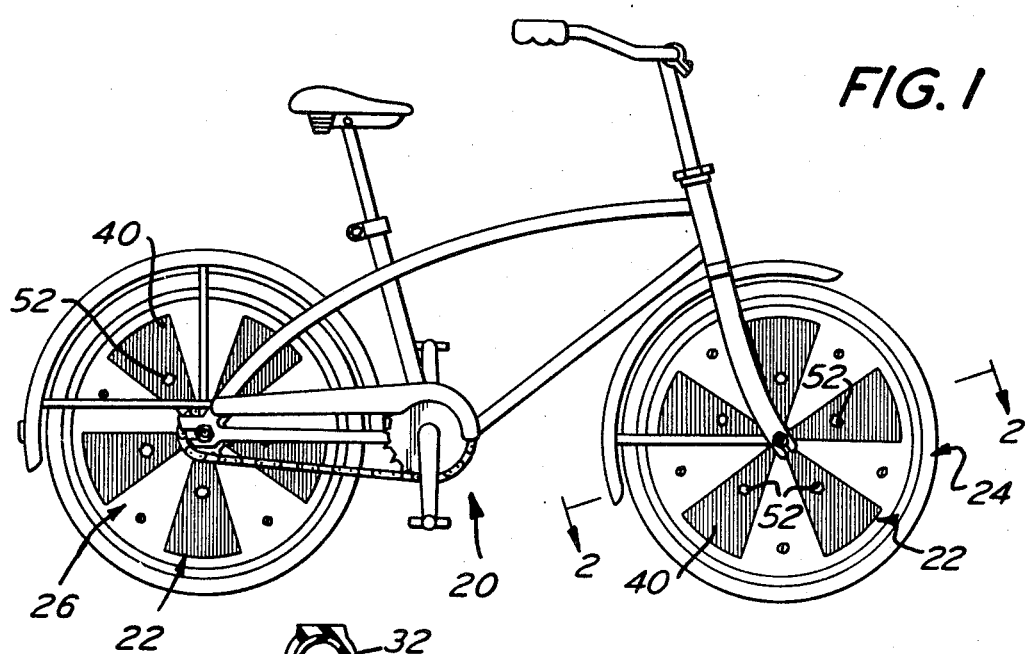
FIG. 1
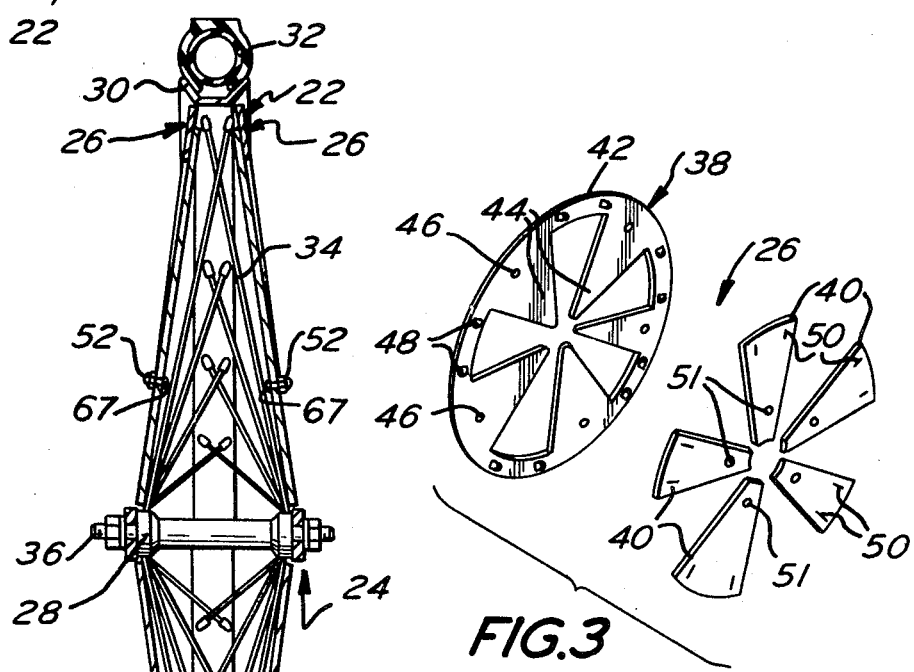
FIG. 2
FIG. 3
INVENTORS.
FRED S. PATANE
JOHN L. CASELLI
BY
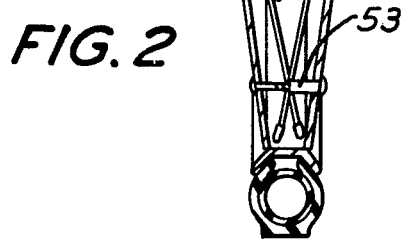
ATTORNEYS.

INVENTORS
FRED S. PATANE
JOHN L. CASELLI
BY
*Caesar, Rivise,
Bernstein & Cohen*
ATTORNEYS.

BICYCLE WHEEL COVER

This invention relates generally to decorative trim for bicycles and more particularly to a cover for the wheels of a bicycle which simulate magnesium automobile wheels.

Almost from the time that automobiles became popular, children have tried to decorate their bicycles to emulate the looks of an automobile. The decoration of bicycles has always been popular and in the last few years, this trend has been extended with the advent of the so-called "spider" bicycles. One of the more popular features in automobiles that the children most wish to emulate with the conventional and "spider" bicycle wheels are the magnesium wheels which are provided on various sport cars.

It has been suggested to provide four half discs which are provided about the wheels of a bicycle which emulate the magnesium hubcaps that are provided on various makes of automobiles. However, these half discs have the disadvantage of not covering the entire length of spoke of the wheel. Consequently, the wheel takes on the typical look of a spoked wheel having a portion of the spokes covered by a trim disc.

Moreover, because of the fact that the pitch of the spoke varies in accordance with the length of the hub assembly in comparison to the width of the rim of the wheel the previous wheel covers had to be provided in accordance with the specific size of wheel that was to be used as well as to the specific pitch of the spokes. Consequently, the covers had to be made in various sizes in accordance with the various spoke pitches for each size of wheel.

It is therefore an object of the invention to overcome the aforementioned disadvantages.

Another object of the invention is to provide a new and improved cover for spoked wheels which is inexpensive to manufacture yet simple to place on the wheels of a bicycle.

Another object of the invention is to provide a cover for spoked wheels which covers entirely the spokes of the wheels.

Yet another object of the invention is to provide a new and improved cover for bicycle wheels which emulate magnesium wheels for an automobile.

Still another object of the invention is to provide a new and improved cover for bicycle wheels which will fit different bicycle wheels having a similar diameter but spokes of which are at different pitches.

These and other objects of the invention are achieved by providing a cover for spoked wheels which includes a pair of side cover plates each of which includes a planar annular band and a plurality of radially tapering projections which are integral with the band and extend inwardly thereof. The band has an outer diameter which is substantially equal to the inner diameter of the rim of the wheel. The plates are secured on opposite sides of the wheels and the projections are adapted to conform to the pitch of the spokes of the wheels.

Other objects and many of the attendant advantages of this invention will be readily appreciated as the same becomes better understood by reference to the following detailed description when considered in connection with the accompanying drawings wherein:

FIG. 1 is a side elevational view of a bicycle embodying the invention;

FIG. 2 is an enlarged sectional view taken along the line 2—2 in FIG. 1;

FIG. 3 is an exploded perspective view of the construction of the sideplate;

Referring now in greater detail to the various figures of the drawing wherein similar reference characters refer to similar parts, a bicycle embodying the invention is shown generally at 20 in FIG. 1.

Figure 4:
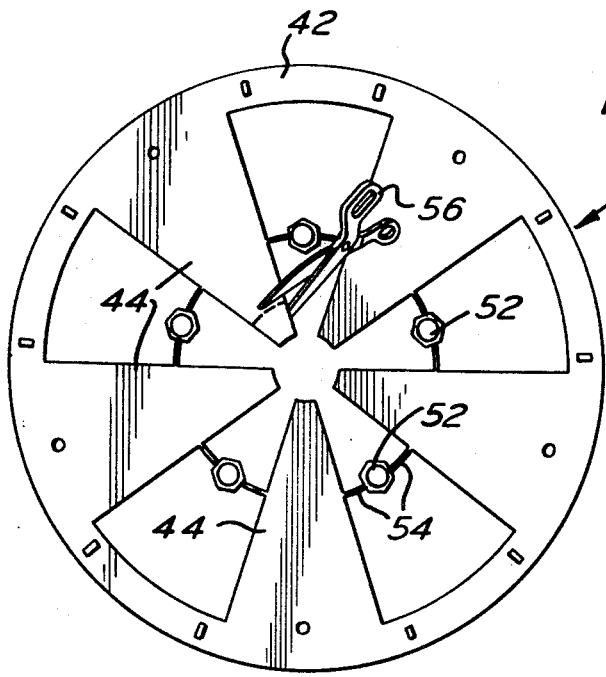
FIG. 4 is an enlarged top plan view of a plate as it comes in a kit during construction thereof to form a cover for the bicycle wheels.

Bicycle 20 is otherwise conventional and includes a pair of covers 22 embodying the invention on each of the front and rear wheels 24.

As best seen in FIG. 2, the cover 22 comprises a pair of side covers 26 which are provided on each side of the wheel 24. Wheel 24 basically comprises a hub 28, a rim 30 for supporting a tire 32 and a plurality of generally radially extending spokes 34 which extend from the ends of the periphery of hub 28 to the rim 30. An axle 36 is mounted within the hub 28.

As best seen in FIG. 3, each of the side covers 26 basically comprises a planar circular plate 38 and a plurality of planar somewhat trapezoidally or sector shaped inserts 40. Plate 38 comprises an annular band 42 and a plurality of inwardly extending projections 44. The projections 44 taper radially toward the center of the plate and with band 42 form a substantially planar circular plate. Each of the projections 44 includes an opening 46 which is located at the base thereof which is substantially adjacent the band 42 of the plate 38. The peripheral band 42 of the plate also includes a plurality of pairs of projections 48 which extend transversely to the plane of plate 38 on the inner surface thereof.

Figure 6:
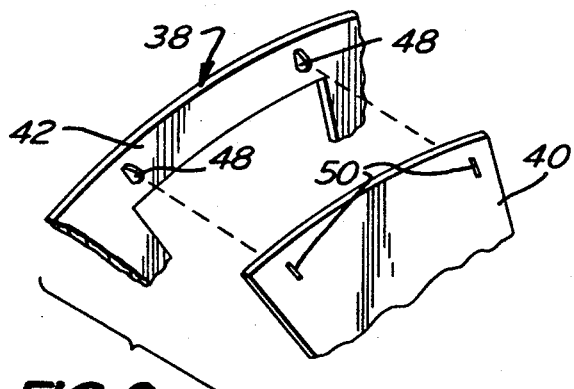
FIG. 6 is an enlarged fragmentary exploded view of an insert being secured to the plate of the side cover.

The inserts 40 are each planar and include a pair of slits 50 at their wide end and an opening 51 centrally of the narrow portion of the insert. As best seen in FIG. 6, the inserts 40 are secured to the inner surface of the plates 38 by aligning the projections 48 on the outer band 42 of the plate 38 with the slits 50 of the insert 40. The slits 50 are then telescoped over the projections 48. The inserts 40 cover the entire area between the projections 44 of the outer plate 38.

Figure 8:
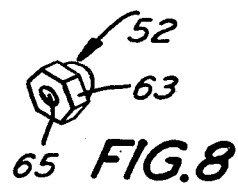
FIG. 8 is an enlarged perspective view of a capnut which is provided on the covers.

As best seen in FIG. 1, to each of the inserts 40, a simulated cap nut 52 is secured. Nut 52 is best seen in FIG. 8. The nut 52 comprises an acorn shaped cap nut 63 having an opening 65 which extends transversely to the inner surface of nut 52. The opening 65 is aligned with and nut 52 is secured adjacent the opening 51 in the insert 40 by a suitable threaded fastener 67 (FIG. 2) which extends through opening 51 into opening 65.

The fasteners 67 are preferably of the self-tapping type and are secured to nut 52 and inserts 40 prior to assembly on the bicycle wheels.

After each of the inserts 40 are secured to the inner surface of the outer plates 38, the cover 22 is assembled by providing one of the side cover plates 26 on each side of the wheel 24. As best seen in FIG. 2, the side cover plates 26 are secured together against the spokes of the wheel by a plurality of fasteners 53.

Figure 7:
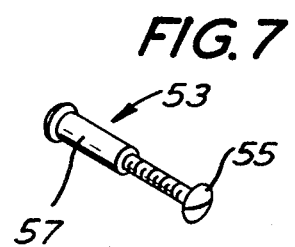
FIG. 7 is an enlarged perspective view of a fastener for use in securing the side plates of the covers to the wheels.

A suitable fastener 53 is shown in perspective in FIG. 7. As seen therein, the fastener 53 comprises a first threaded fastener 55 which is preferably a conventional machine screw. The remaining portion 57 of the fastener includes an elongated stem which is tubular and is threaded on the inner bore thereof to receive the machine screw 55. The portions 55 and 57 are screwed together from opposite sides of the covers to thereby secure the covers together.

It should be noted that the outer diameter of the peripheral band 42 is substantially similar to the inner diameter of the rim 30. As best seen in FIG. 4, the plate 38 is preferably formed together with the capnuts 52. Similarly, each of the inserts 40 for a side cover plate 26 are formed together on a single sheet 59 as best seen in FIG. 6. It is contemplated that a kit for a bicycle shall be sold which includes four plates 38 as shown in FIG. 4 with four sheets 59 shown in FIG. 5.

In order to assemble a cover plate, the nuts 52 are separated from the side cover plate 38 by completely removing the mold ribbons 54. As indicated by the scissors 56, the projections 44 are cut at their endmost points in order to provide enough room for the hub of the wheel. That is, as formed, the projections 44 extend substantially the entire radius of the plate 38.

In order to make room for the hub, the projections 44 are cut as shown in FIG. 4. Where very small hubs are used on a wheel, it may not be necessary to remove any portions of projections 44.

Figure 5:
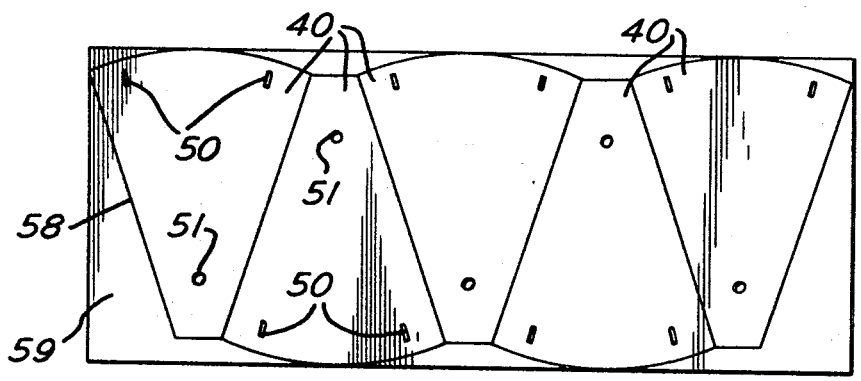
FIG. 5 is an enlarged top plan view of a sheet provided in a kit to form inserts for the side plates of the covers.

As seen in FIG. 5 and set forth above, the inserts 40 are also formed together in one sheet 59. Sheet 59 is provided with score lines 58 which are formed at the periphery of the inserts 40 so that the inserts may be ripped out of the sheet 59 along the score lines.

Because the projections 44 are connected to the outer band 42 only at the base thereof, the ends of the projections are free to move out of the plane of the band 42. Thus, when the band 42 is pressed against the spokes of the wheels adjacent the rim 30, the projections 44 conform to the shape of the spokes on the wheel.

Consequently, whatever is the pitch of the spokes of the wheel with respect to a vertical plane, the projections 44 are bent outwardly to conform thereto. It should also be noted that the inserts 40 are connected to the band 42 of the wheel only at projections 48 so that the narrow ends of inserts which are adjacent the center of the cover plate can move with respect to projections 44 in order to conform with the shape of the spokes.

In a preferred embodiment, the plates 38 are each preferably comprised of a moldable thermoplastic resin and coated with an outer layer of metallized paint in order to simulate metal parts particularly magnesium or aluminum. Similarly, the nuts 52 which are formed with the plates 38 are also so coated.

The inserts 40 are preferably formed of a moldable thermoplastic resin and colored black so that there is a black backing provided against the outer metallic colored plate. This color combination provides a striking contrast between the inserts 40 and the outer plate 38. The illusion formed by the side cover plate is that of a magnesium wheel. It should also be understood that due to the conformability of the projections and the inserts, the pitch of the spokes is immaterial to the fit of the cover plates to the wheel. Consequently, the thickness of the tire or other factors which would change the pitch of the spokes become immaterial.

It should also be noted that the size of the hub is also immaterial in that the plates 38 and the inserts 40 are made of a plastic material which can be trimmed in order to extend only to the periphery of the hub. A single size of plate 38 and inserts 40 can therefore be used on a wide range of similarly sized wheels having different sized hubs. For example, the same size plates can be used for both the front and rear wheels of a bicycle even though the rear wheel normally includes an enlarged hub.

Without further elaboration, the foregoing will so fully illustrate my invention that others may be applying current or future knowledge readily adapt the same for use under various conditions of service.

We claim:

1. A cover for a spoked wheel, said cover including a pair of sideplates, each of said plates comprising a planar annular band and a plurality of extending projections which are integral with said band and extend inwardly thereof, said band having an outer diameter which is substantially similar to the inner diameter of the rim of said wheel, said plates being secured on opposite sides of said wheel, said projections being terminated adjacent the center of said plate and each being separated from the other of said projections are free to conform to the spoke of said wheel.

2. A cover for a spoked wheel, said cover including a pair of sideplates, each of said plates comprising a planar annular band and a plurality of radially extending projections which are integral with said band and extend inwardly thereof, said band having an outer diameter which is substantially similar to the inner diameter of the rim of said wheel, said plates being secured on opposite sides of said wheel, said projections being free to conform to the spokes of said wheel, said side plates further including a plurality of sector shaped inserts, each of said inserts being planar and having means for securing said inserts to the inner surface of the band of said sideplates so that said insert completely covers the opening between adjacent ones of said projections to cover all of the spokes of said wheel.

3. The invention of claim 2 and further including a plurality of simulated capnuts, each of said capnuts including an opening centrally located therein, said capnuts being secured at the openings of said plurality of inserts of a sideplate so that said side plates emulate magnesium automobile wheels.

4. The invention of claim 2, wherein said inserts each include a pair of slits at one end thereof, said bands of said sideplates including a plurality of lateral projections on the inner surface thereof, said inserts being secured to said bands by aligning said lateral projections with said slits.

UNITED STATES PATENT OFFICE

CERTIFICATE OF CORRECTION

Patent No. 3,602,550      Dated August 31, 1971

Fred S. Patane
      and
    John L. Caselli

It is certified that errors appear in the above-identified patent and that said Letters Patent are hereby corrected as shown below:

(1) Claim 1, line 19 after the word "projections" insert the following:

--at said center so that said projections--

(2) Claim 3, line 37 after the word "opening" insert the following:

--, each of said inserts having an opening--

Signed and sealed this 18th day of January 1972.

(SEAL)
Attest:

EDWARD M. FLETCHER, JR.  ROBERT GOTTSCHALK
Attesting Officer     Acting Commissioner of Patents